3,494,733
Patented Feb. 10, 1970

3,494,733
METHOD FOR THE PRODUCTION OF ALUMINA TRIHYDRATE DOMINANT IN BAYERITE
Carl D. Keith, Summit, N.J., and Kurt W. Cornely, Syosset, N.Y., assignors to Engelhard Industries, Inc.
No Drawing. Filed Dec. 8, 1964, Ser. No. 416,902
Int. Cl. C01f 7/42
U.S. Cl. 23—143         13 Claims

ABSTRACT OF THE DISCLOSURE

Alumina predominating in trihydrate is made without aging by reacting water in the liquid phase and aluminum having a surface area of about 75,000 to 1,000,000 square millimeters per gram, at a temperature of about 50 to 250° C. and at a basic pH. Ammonium ions can provide the basic pH which may, for instance, be greater than about 9.6. Water can be supplied in a preferred ratio of about 6 to 35 moles per gram atom of aluminum, and advantageously the aluminum has a surface area of about 100,000 to 750,000 square millimeters per gram. The product contains a relatively small amount of gibbsite, and usually predominates in bayerite, although the three trihydrates are present.

---

This invention relates to the preparation of hydrous alumina in which the product is a mixture predominating in alumina trihydrate phases. From these alumina slurries valuable catalyst supports can be manufactured, for instance, for use in the process of U.S. Patent 2,838,444. This invention is based on the discovery that aluminum metal of high surface area and in a very fine state of subdivision, can be reacted with water at a basic pH to yield a predominantly trihydrate alumina without the need for extensive aging.

This invention is advantageous in its speed and in the fact that the completeness of the reaction (usually at least about 95%, often essentially 100%) and its freedom from reliance on non-vaporizable reagents gives a purer product for uses such as in catalysts where purity is often essential. This invention can provide the alumina as a more concentrated product than other processes; often yielding about 10–30% alumina in the aqueous product, preferably about 15–25%.

The process of this invention offers a number of manipulative advantages. It avoids the indirect production methods heretofore used. Such indirect methods generally comprise the conversion of aluminum into aluminum salts which are used to make aqueous solutions from which, under the proper conditions, alumina of the desired type is precipitated. Further, the concentrated alumina product of this invention may often be directly converted into a catalyst or catalyst base by spray drying and calcination without a need for precipitation and filtering. Even if filtering is needed, the alumina is often more easily filtered because of the basic pH employed. This invention, therefore, radically simplifies the procedures needed to produce alumina trihydrate mixtures.

In the process of this invention very finely divided aluminum is contacted with water in the liquid phase at a temperature above ambient. The aluminum herein used is sufficient in itself to impart a basic pH to the water after a short period of reaction. A more complete reaction of the aluminum, in the range of about 98–100%, may be obtained by the addition of certain basic-acting reagents to the reaction mixture. Also, these and other reagents may be employed to adjust the proportions of the various alumina modifications appearing in the alumina product and the subsequent dried and/or calcined catalyst or catalyst support. The basic pH is generally not above about 12 and often is in the range of about 9 to 11. The process of this invention can, and usually does, take place in the essential absence of promoting metals or compounds of metals having an atomic number of 21 or higher.

The art has suggested reacting aluminum metal with water under a wide variety of conditions to form alumina. In one group of these processes, very high temperature and pressure conditions, as well as conditions of extreme agitation are employed to produce the alumina and often the reaction does not go to completion, that is, substantial amounts of free aluminum are left at the end of the reaction. In another group of processes, more moderate temperatures and pressures are employed but these processes usually require the presence of mercury or other heavy metal promoters to achieve commercially useful results. Further, these processes do not yield an alumina product having the desired preponderance of alumina trihydrate phases.

Although in many of these processes it has been proposed that aluminum powder may be employed, cost factors often dictate the use of grosser forms, which use appears, in the art, to give no significant difference in the results obtainable. This invention uses aluminum of high surface area and this requirement necessitates a finer state of subdivision for the aluminum than what the art has generally called "powder." Useable forms of aluminum for this invention have a surface area of about 75 thousand to 1 million square millimeters per gram (BET), preferably about 100,000 to 750,000 mm.²/gm. Aluminum meeting such requirements often is in the general particle size range of about 2 to 100 microns. Preferably, at least about 70% of the particles are of about 10 to 40 microns. The aluminum is usually one where at least about 97% of the powder can pass a 325 mesh sieve (U.S. Standard Sieve Series), which is finer than most materials referred to as "powder." Aluminum suitable for use in the process of this invention is commercially available for use as an adhesive. Usually it has a purity greater than about 99% or even greater than about 99.9% and may be obtained by atomizing molten aluminum in air. It will often have a particle size predominating in the approximate 5 to 50 micron range, for instance, as follows:

| Particle size, microns: | Proportion of particles, percent |
|---|---|
| 3.5–10 | 5–7 |
| 10–20 | 15–26 |
| 20–30 | 16–29 |
| 30–40 | 26–31 |
| 40–44 | 3–25 |
| 44–70 | 4–13 |

If the aluminum contains more than about 15% of particles in the range of 44–70$\mu$, or an appreciable amount of particles above 70$\mu$, the reaction requires an inordinately longer time to go to completion or may never go to completion, under the conditions of the present invention and usually will not give the desired proportion of alumina trihydrate modifications in the product without aging. Too fine a particle size may lead to temperature control problems.

This invention employs a liquid phase reaction which generally takes place at elevated temperatures of at least about 50° C. Temperatures of about 55–85° C. are preferred. Although temperatures up to about 500 pounds steam pressure, that is, up to about 250° C. may be employed, no need is seen for resort to such temperatures and their concomitant pressurized equipment.

This invention is advantageous in its speed and the completeness of reaction. When additional reagents are employed to insure completeness of reaction or to alter the distribution of alumina modifications of the product, completely vaporizable reagents will usually be employed to insure product purity, preferably without the need even for washing of the alumina product.

In U.S. Patent 2,838,444 the desired alumina product suitable for use as a catlyst precursor predominates in crystalline alumina trihydrate, primarily of three types: The alpha trihydrate or gibbsite, the beta trihydrate or bayerite and a third form called, in the patent "randomite" but now generally known as "nordstrandite." Also present in the desired precursor may be other forms of alumina, usually at least about 5%, preferably about 10 to 35% of boehmite and/or amorphous hydrous alumina.

As mentioned before, in the present invention the basic pH of the reaction medium may be supplied by the aluminum itself. Aluminum samples, when added to deionized water (pH about 5.3) impart a pH of about 6.3–6.4 to the aluminum slurry when first added and mixed. Upon being allowed to stand, a pH of about 9.8 to 9.9 usually results. However these reactions between water and aluminum usually only go to about 95–97% or so completion. It is preferred, therefore, to add an extraneous material to the reaction mixture to get substantial (usually better than about 98% conversion of the aluminum, often essentially 100%) completion of the reaction. Advantageously, this added material will not be such as to lose the desired basic pH and preferably will maintain a pH of greater than about 9.6, for instance, about 9.8 to 10.6.

The added material is water-soluble and generally provides or maintains hydroxyl ions in the water. Ammonia, including water-soluble organic substituted ammonia, in itself, or as the hydroxide or salt forms is usually used. These materials give the preferred ammonium ions. Where the presence of alkali metal in the finished product is not objectionable or where a sufficient number of washings may be given to the alumina product, alkali metal hydroxides and salts may be employed. Hydroxides, carbonates or organic carboxylates, i.e. lower fatty acid salts, may be employed and be vaporized in the further processing of the alumina, or chlorides, etc., may be used when traces of such anions in the alumina will not be harmful or when they may be removed by washing or other means. Suitable organic substituted ammonia, such as, lower alkyl amine compounds, may have 1–4 alkyls and ordinarily will have a total of about 1–8 carbon atoms. The alkyl groups may sometimes be further substituted, for example, with aryl. Diamines may be employed but these, like other bivalent cations such as calcium, are not preferred. Ammonium hydroxide, ammonium chloride, ammonium trichloracetate, tetramethyl-ammonium compounds, sodium chloride, sodium carbonate, etc., may be used. Preferably, those materials which give a hydroxy ion concentration less than the concentration which would be given by the aluminum metal alone, such as sodium bicarbonate, are not used.

A very minor amount of the extraneous reagent is usually added, say about 0.0001 to 0.05 mole of the reagent to a gram atom of aluminum. Often the reagent is used in an amount sufficient to supply about 0.0005 to 0.01 mole of ammonium, including substituted ammonium or alkali metal, ions per gram atom of aluminum. Where a chloride is added, about 0.0001 to 0.005 mole chloride ion may appear in the mixture per gram atom of aluminum.

The water will usually comprise more than about half the weight of the reaction mixture and frequently is supplied in the amount of at least about three moles of water per gram atom of aluminum and may be as much as about 35 or more moles per gram atom of aluminum. Preferably enough water is used to supply about 6 to 30 moles per gram atom of aluminum. The reaction is generally conducted for a period of time sufficient to give essentially complete reaction of the aluminum. This period frequently ranges from about 1 or 2 hours to one or two days or more. Often the reaction goes to completion within 3.5 to 55 hours.

It is often preferred to add the aluminum metal incrementally to the aqueous medium, the total amount of aluminum to be employed being divided into at least two portions. Each portion will usually be less than about 75% of the total aluminum, preferably less than about 60%. Sometimes the first portion is larger than the others, the subsequent portions being advantageously no greater than about 50% of the lot. At least one of the portions is usually allowed to react to at least about 75% completion, preferably at least about 90% completion before a subsequent portion is added; for example, the first aluminum portion added may be at least 75% converted to alumina before the last portion is added.

It is often advantageous to initiate the water-aluminum reaction at a temperateure no higher than about 70° C.; especially in the case of incremental aluminum addition it is desirable to maintain the temperature at 70° C. or below during each aluminum addition to prevent unduly large bayerite formation which in turn may lead to a weaker final solid product. Maintaining the temperature gives a more favorable distribution of the three alumina trihydrate modifications. The following examples are cited to illustrate the process of the present invention and to indicate the benefits afforded by the practice of this invention; they should not be considered limiting.

EXAMPLE I

To a 1-liter, fluted, three-necked Pyrex flask fitted with an agitator, a reflux condenser and a thermoregulator, were added 25 grams (0.925 mole) of atomized aluminum metal (99.98% purity, BET surface area 240,000 mm.$^2$/g., particle size distribution of 5–50$\mu$), 500 cc. deionized water, and a volume of 29% aqueous ammonia equivalent to 0.011 mole $NH_3$. The reaction was initiated at room temperature, raised to 70° C. and maintained at this temperature. The agitator, having a rate variable from 450 to 1,800 r.p.m., was set so as to give 850 r.p.m. The course of the reaction was followed by means of a wet test meter which recorded the total volume of hydrogen evolved as the reaction proceeded. At the end of 24½ hours there was no further evidence of unreacted aluminum in the reaction vessel. The mixture was filtered and dried at 120° C. and then analyzed by X-ray diffraction for composition. The results of these analyses showed the following composition: amorphous alumina 5%; boehmite (35 A.) 7%; bayerite 58%; nordstrandite 25%; gibbsite 5%.

EXAMPLE II

To a reactor fitted as described in Example I, were added 500 cc. deionized water, 65 grams (2.41 moles) atomized aluminum (99.98% purity, BET surface area 240,000 mm.$^2$/g.; particle size distribution 5–50$\mu$), and 2.9 cc. of 29% ammonium hydroxide (0.050 mole $NH_3$). Under agitation at 600 r.p.m., the reaction mixture was raised from room temperature to 70° C. and held at this temperature. At the end of 26 hours there was no evidence of unreacted aluminum metal in the reaction vessel. The mixture was filtered and dried at 120° C. and then analyzed by X-ray diffraction for composition. The results of these analyses showed the following: amorphous alumina 4%; boehmite 10% (25 A.); bayerite 56%; nordstrandite 24%; gibbsite 6%.

EXAMPLE III

To show the results obtainable by reacting aluminum powder with water according to this invention without an extraneous reagent, a reaction vessel was fitted as in Example I and was supplied with 25 grams (0.925 mole) atomized aluminum metal (BET surface area 190,000 mm.$^2$/g., 99.98% purity, and a particle size distribution in the range of 5–50$\mu$) and 500 cc. deionized water. The reaction was initiated at room temperature, raised to 65° C. and held at this temperature for a period of 23 hours. At the end of this time, there was a 97.5% conversion of the aluminum metal to alumina as indicated by the total hydrogen produced. The alumina was isolated from the unreacted aluminum by decantation, filtered, and dried at 120° C. and analyzed by X-ray diffraction for alumina composition. The results of these analyses showed the composition to be: amorphous alumina 12%; boehmite 10% (45.5 A.); bayerite 54%; nordstrandite 20%; gibbsite 4%.

Where a similar reaction was performed at 65° C. using an aluminum of 99.5% purity, 5–50μ particle distribution and a surface area (BET) of 300,000 mm.$^2$/g., the reaction went to 95.8% completion and the product had about 29% amorphous, 13% boehmite and 58% mixed trihydrate phases.

EXAMPLE IV

To a reaction vessel fitted as cited in Example I was added 20 grams (0.74 mole) atomized aluminum (BET surface area 210,000 mm.$^2$/g., 99.89% purity, and having a particle size distribution of 5–70μ), 400 cc. of deionized water, and enough of a 10% solution of tetramethylammonium hydroxide to raise the pH of the reaction mixture to 9.5. The reaction was initiated at room temperature, raised to 55–58° C. and held at that temperature. At the end of 19 hours there was no evidence of unreacted aluminum remaining in the reaction vessel. A sample with withdrawn, filtered, and dried at 120° C. The dried sample was analyzed by X-ray diffraction for composition. The results of these analyses showed the following composition: amorphous alumina 1%; boehmite 6% (crystallite size too small to measure); bayerite 65%; nordstrandite 23%; gibbsite 5%.

To the remainder of the reaction mixture, which had been cooled to 35° C., was added an additional quantity of aluminum metal as described above (10 grams, 0.37 moles), and the reaction continued. There was no external heat applied after the temperature reached 45° C., at which time the heat was cut off, but the temperature continued to rise until it reached 78° C. External cooling had to be applied to prevent the reaction temperature from climbing even higher. At the end of 45 minutes there was no evidence of unreacted aluminum metal in the reaction vessel. A sample was withdrawn, filtered, and dried at 120° C. and analyzed by X-ray diffraction. The results of these analyses showed the following composition: amorphous alumina 0%; boehmite, less than 1% (crystallite size too small to measure); bayerite 79%; nordstrandite 16%; gibbsite 4%.

To the remaining reaction mixture, which had been cooled to 48° C., was again added an additional 10 grams (0.07 mole) of aluminum metal as cited above. There was no external heat applied to the system. During a period of 42 minutes the reaction temperature rose to 60° C. and held there. At the end of this 42 minutes there was no evidence of unreacted aluminum metal. The mixture was filtered, and dried at 120° C. and analyzed by X-ray diffraction for composition. The results of these analyses indicated the following composition: amorphous alumina 0%; boehmite 2% (crystallite size too small to measure); bayerite 82%; nordstrandite 14%; gibbsite 2%.

EXAMPLE V

To a reaction vessel fitted as cited in Example I, was added 500 cc. deionized water 25 grams (0.927 mole) atomized aluminum (BET surface area 210,000 mm.$^2$/g., 99.89% purity, and a particle size distribution of 5–50 μ), and a quantity of ammonium chloride salt equivalent to 0.15% chloride based on total alumina (0.107 gram NH$_4$Cl, 0.002 mole). The reaction was initiated at room temperature, raised to 70° C. and maintained at that temperature. At the end of 29 hours there was no evidence of unreacted aluminum metal in the reaction vessel. The reaction mixture was filtered and dried at 120° C. and analyzed by X-ray diffraction for alumina composition. The results of these analyses showed the following composition: amorphous alumina 0%; boehmite 1% (crystallite size too small to measure); bayerite 64%; nordstrandite 29%; gibbsite 7%.

EXAMPLE VI

To a reaction vessel fitted as cited in Example I, was added 20 grams (0.74 mole) atomized aluminum metal (BET surface area 210,000 mm.$^2$/g., 99.89% purity, particle size distribution of 5–50μ), 400 cc. deionized water, and 0.0935 g. (0.0016 mole) sodium chloride salt equivalent to 0.15% chloride based on alumina as Al$_2$O$_3$. The reaction was initiated at room temperature and the temperature raised to 100° C. and held at this temperature. At the end of 19.5 hours hydrogen production had ceased and approximately 99% of the aluminum metal had been converted to alumina hydrates. The reaction product was isolated from the unreacted aluminum by decantation, filtered, and dried at 120° C. and analyzed by X-ray diffraction for alumina composition. The results of these analyses indicated the following composition: amorphous alumina 0%; boehmite 34% (29.4 Angstrom crystallite); bayerite 37%; nordstrandite 17%; gibbsite 12%.

EXAMPLE VII

To a reaction vessel fitted as cited in Example I was added 25 grams (0.925 moles) atomized aluminum metal (BET surface area 270,000 mm.$^2$/g., 99.98% purity, and a particle size distribution of 5–50μ), 500 cc. deionized water, and 0.121 grams ammonium trichloroacetate equivalent to 0.15% chloride based on total Al$_2$O$_3$. The reaction was initiated at room temperature and then raised to 100° C. and held at that temperature for 24 hours. At the end of twenty-four hours the mixture still contained unreacted aluminum metal, but the total conversion was 98.2%. The reaction product was isolated from the unreacted aluminum metal by decantation and analyzed by X-ray diffraction for alumina composition. The results of these analyses indicated the following composition; amorphous alumina 0%; boehmite 31% (52.6 A.); bayerite 38%; norstrandite 59%; gibbsite 7%.

EXAMPLE VIII

To a 50 gallon, stainless steel reactor, fitted with a 6-bladed perpendicular turbine agitator, set to rotate at 400 r.p.m., with a turbine tip speed equivalent to 600 ft./min. a six tube, straight-through reflux condenser and a wet test meter capable of 20 ft.$^3$/min. capacity, was added 45 gallons (20.8 pound-moles) deionized water, 36.5 pounds (1.35 pound atoms) of atomized aluminum metal (BET surface area 270,000 mm.$^2$/g., 99.98% purity, and a particle size distribution of 5–50μ), and 500 cc. of 29%, 0.90 gravity aqueous ammonia (0.282 pound, 0.023 pound-omle). Reaction was initiated at room temperature (85° F.), then raised to 70° C. (160° F.) and maintained at that temperature for 23.5 hours. At the end of that time, there was no evidence of unreacted aluminum metal in the reaction mixture. The reaction product was dried at 120° C. and analyzed by X-ray diffraction for alumina. The results of these analyses indicated that the following composition: amorphous alumina 2%; boehmite 17% (28.6 A.); bayerite 54%; nordstrandite 20%; gibbsite 7%.

EXAMPLE IX

To show the slight effect of iron compounds on the reaction, a three-necked, resin-type, baffled Pyrex reaction flask was fitted with a reflux condenser, a double turbine agitator, rotating at 1050 r.p.m. (equivalent to 900 ft./ min.) and a thermoregulator. 500 cc. deionized water (27.8 gm.-moles); 50 grams (1.85 gm.-moles) of atomized aluminum (99.99% purity, 0.0018% Fe, 5–50μ particle size distribution, surface area 320,000 mm.$^2$/g.) and enough 29%, 0.90 sp. gr. aqua ammonia to give 0.0222 gm.-mole NH$_3$ were added. In addition, a quantity of ferric nitrate nonahydrate was added to give the equivalent of 4.8×10$^{-4}$ gm./moles Fe$^{+++}$. The thermoregulator was set to control at 70° C.±2° C. and reaction initiated at ambient temperature. The reaction was allowed to proceed for a period of 24 hours, at which time there remained unreacted aluminum (0.17 gm., 0.0063 gm.-mole recovered). The alumina product was recovered by decantation, filtration, and finally drying at 120° C. The composition, determined by X-ray diffraction was: 1% amorphous, 9% boehmite, 57% bayerite, 26% nordstrandite and 7% gibbsite. Iron content in the product, determined by emission spectroscopy was 0.0295%. When this run was repeated without the addition of ferric nitrate, the product was 1% amorphous, 8% boehmite, 52% bayerite, 32% nordstrandite, 7% gibbsite and 0.0010% iron.

The results of these runs are summarized in the following table.

TABLE I

| Example | Extraneous Agent | Time (hrs.) | Percent Completion of Reaction | Trihydrate Product, percent | | | | |
|---|---|---|---|---|---|---|---|---|
| | | | | Amorphous | Boehmite | Bayerite | Nordstrandite | Gibbsite |
| I | NH₃ | 24½ | 100 | 5 | 7 | 58 | 25 | 5 |
| II | NH₃ | 26 | 100 | 4 | 10 | 56 | 24 | 6 |
| III | None | 23 | 97.5 | 12 | 10 | 54 | 20 | 4 |
| IVa | (CH₃)₄NOH | 19 | 100 | 1 | 6 | 65 | 23 | 5 |
| IVb | (CH₃)₄NOH | 19¾ | 100 | 0 | <1 | 79 | 16 | 4 |
| IVc | (CH₃)₄NOH | 20½ | 100 | 0 | 2 | 82 | 14 | 2 |
| V | NH₄Cl | 29 | 100 | 0 | 1 | 64 | 29 | 7 |
| VI | NaCl | 19½ | 99 | 0 | 34 | 37 | 17 | 12 |
| VII | NH₄AcCl₃ | 24 | 98.2 | 0 | 31 | 38 | 59 | 7 |
| VIII | NH₃ | 23.5 | 100 | 2 | 17 | 54 | 20 | 7 |
| IX | NH₃ | 24 | 99.7–100 | 1 | 8 | 52 | 32 | 7 |

It is claimed:

1. A method for the production of alumina product which predominates in alumina trihydrate and contains bayerite as the dominant trihydrate as determined by X-ray diffraction analysis of dried samples of said product, which consists essentially of reacting water in the liquid phase and aluminum at a temperature of about 50–250° C. and at a basic pH of up to about 12 and at a ratio of at least about 3 moles of water per gram atom of aluminum, said aluminum having a surface area of about 75 thousand to 1 million square millimeters/gram, said reaction taking place in the presence of about 0.0001 to 0.05 mole per mole of aluminum of a water-soluble material selected from the group consisting of the hydroxides and chlorides of alkali metals, ammonium and lower alkyl amines.

2. The method of claim 1 in which the pH is greater than about 9.6.

3. The method of claim 2 in which the pH of at least about 9.6 is provided by the presence of ammonium ions.

4. The method of claim 3 in which about 6 to 35 moles of water are supplied per gram atom of aluminum.

5. The method of claim 4 in which the aluminum particles are in the size range of about 5 to 50 microns.

6. The method of claim 1 in which the reaction is conducted at a temperature of about 55–85° C.

7. The method of claim 6 in which the water soluble material is ammonium hydroxide or a lower alkyl amine hydroxide.

8. The method of claim 1 in which the basic pH is obtained by ammonium ions.

9. The method of claim 8 in which the temperature is about 55 to 85° C.

10. A method for the production of alumina product which predominates in alumina trihydrate and contains bayerite as the dominant trihydrate as determined by X-ray diffraction analysis of dried samples of said product, which consists essentially of reacting water in the liquid phase with a plurality of portions of aluminum at at temperature of about 50–250° C., at a basic pH of up to about 12 and in a ratio of at least about 3 moles of water per gram atom of aluminum, said aluminum having a surface area of about 75 thousand to 1 million square millimeters/gram, each of said portions comprising less than about 75% of the total aluminum employed and the reaction of a preceding portion being allowed to go to at least 75% completion before a subsequent portion is added, said reaction taking place in the presence of about 0.0001 to 0.05 mole per mole of aluminum of a water-soluble material selected from the group consisting of the hydroxides and chlorides of alkali metals, ammonium and lower alkyl amines.

11. The method of claim 10 in which each portion comprises less than about 60% of the total aluminum, and reaction of at least about 90% of a preceding portion is allowed before addition of a subsequent portion.

12. The method of claim 10 in which the temperature is maintained at no higher than about 70° C. during each addition of aluminum.

13. The method of claim 12 in which the basic pH is about 9–12 and is obtained by ammonium ions, the temperature is about 55–85° C., and the alumina product is separated from the reaction medium.

References Cited

UNITED STATES PATENTS

| 2,973,245 | 2/1961 | Teter et al. | 23—143 |
| 2,989,372 | 6/1961 | Gilbert | 23—143 |
| 2,733,219 | 1/1956 | Bloch | 23—143 X |
| 2,973,245 | 2/1961 | Teter et al. | 23—143 |
| 2,915,475 | 12/1959 | Bugosh | 23—143 X |
| 3,042,628 | 7/1962 | Cramer et al. | 23—143 X |
| 3,222,130 | 12/1965 | Hauschild | 23—143 |
| 3,264,062 | 8/1966 | Kehl et al. | 23—143 X |

OTHER REFERENCES

Newsome et al., "Alumina Properties," Aluminum Co. of America, Pittsburgh, Pa., 1960, pp. 62 and 63.

Morrison et al., Organic Chemistry, Allyn and Bacon, Inc., Boston, 1961, p. 519.

OSCAR R. VERTIZ, Primary Examiner

G. T. OZAKI, Assistant Examiner

U.S. Cl. X.R.

252—463